US006901406B2

(12) United States Patent
Nabe et al.

(10) Patent No.: US 6,901,406 B2
(45) Date of Patent: May 31, 2005

(54) METHODS AND SYSTEMS FOR ACCESSING MULTI-DIMENSIONAL CUSTOMER DATA

(75) Inventors: Oumar Nabe, New York, NY (US); Michael A. Souery, North Potomac, MD (US)

(73) Assignee: General Electric Capital Corporation, Stamford, CT (US)

( * ) Notice: Subject to any disclaimer, the term of this patent is extended or adjusted under 35 U.S.C. 154(b) by 451 days.

(21) Appl. No.: 09/751,859

(22) Filed: Dec. 29, 2000

(65) Prior Publication Data

US 2002/0049701 A1 Apr. 25, 2002

Related U.S. Application Data

(60) Provisional application No. 60/173,588, filed on Dec. 29, 1999.

(51) Int. Cl.[7] ............................. G06F 7/00; G06F 9/44
(52) U.S. Cl. ......................... 707/102; 707/100; 705/38
(58) Field of Search ............................. 707/1, 3–4, 10, 707/100–104.1, 203–204; 709/250–252; 717/3, 180, 170; 705/36–38; 706/21–23

(56) References Cited

U.S. PATENT DOCUMENTS

| | | | |
|---|---|---|---|
| 5,724,556 A | 3/1998 | Souder et al. | |
| 5,724,575 A | 3/1998 | Hoover et al. | |
| 5,870,746 A | 2/1999 | Knutson et al. | |
| 5,893,076 A | 4/1999 | Hafner et al. | |
| 6,088,722 A | 7/2000 | Herz et al. | |
| 6,182,060 B1 | 1/2001 | Hedgcock et al. | |
| 6,236,975 B1 | 5/2001 | Boe et al. | |
| 6,263,341 B1 | 7/2001 | Smiley | |
| 6,292,830 B1 | 9/2001 | Taylor et al. | |
| 6,292,933 B1 | 9/2001 | Bahrs et al. | |
| 6,385,604 B1 * | 5/2002 | Bakalash et al. | ............... 707/3 |
| 6,477,536 B1 * | 11/2002 | Pasumansky et al. | ........ 707/102 |
| 6,546,545 B1 * | 4/2003 | Honarvar et al. | ........... 717/100 |

* cited by examiner

Primary Examiner—Uyen Le
Assistant Examiner—Te Yu Chen
(74) Attorney, Agent, or Firm—Armstrong Teasdale LLP

(57) ABSTRACT

Methods and systems for modeling customer data into a multi-dimensional structure for access to enable efficient customer targeting are described. The method includes the steps of compiling data from multiple sources to create a relational database, using tools to model data within the relational database, scoring the modeled data, integrating scores into a multi-dimensional structure and providing access to end users to the multi-dimensional structure.

28 Claims, 6 Drawing Sheets

METHODS AND SYSTEMS FOR ACCESSING MULTI-DIMENSIONAL CUSTOMER DATA

CROSS REFERENCE TO RELATED APPLICATIONS

This application claims the benefit of U.S. Provisional Application No. 60/173,588, filed Dec. 29, 1999, which is hereby incorporated by reference in its entirety.

BACKGROUND OF THE INVENTION

This invention relates generally to marketing and, more particularly, to methods and systems for identifying and marketing to segments of potential customers.

Typical marketing strategies involve selecting a particular group based on demographics or other characteristics, and directing the marketing effort to that group. Known methods typically do not provide for proactive and effective consumer relationship management or segmentation of the consumer group to increase efficiency and returns on the marketing campaign. For example, when a mass mailing campaign is used, the information used to set up the campaign is not segmented demographically to improve the efficiency of the mailing. The reasons for these inefficiencies include the fact that measurement and feedback is a slow manual process that is limited in the depth of analysis. Another reason is that data collected from different consumer contact points are not integrated and thus does not allow a marketing organization a full consumer view.

Results of this inefficient marketing process include loss of market share, increased attrition rate among profitable customers, and slow growth and reduction in profits.

BRIEF SUMMARY OF THE INVENTION

Modeling customer data into a multi-dimensional structure to determine a targeting strategy allows user make efficient use of multiple sources of such customer data. The systems described herein implement a method of compiling data from multiple sources to create a relational database. Tools are used to model the multiple source customer data within the relational database. After modeling, scores are applied to the modeled data and the scores are then integrated scores into a multi-dimensional structure. By accessing the structure, end users are able to efficiently manage targeting of future customers.

DETAILED DESCRIPTION OF THE INVENTION

Exemplary embodiments of processes and systems for generating a multi-structure of customer data, accessible to end users of such data are described below in detail. In one embodiment, the system is internet based. The exemplary processes and systems combine advanced analytics, On Line Analytical Processing (OLAP) and relational data base systems into an infrastructure. This infrastructure gives users access to information and automated information discovery in order to streamline the planning and execution of marketing programs, and enable advanced customer analysis and segmentation of capabilities.

The processes and systems are not limited to the specific embodiments described herein. In addition, components of each process and each system can be practiced independent and separate from other components and processes described herein. Each component and process can be used in combination with other components and processes.

Figure 1:
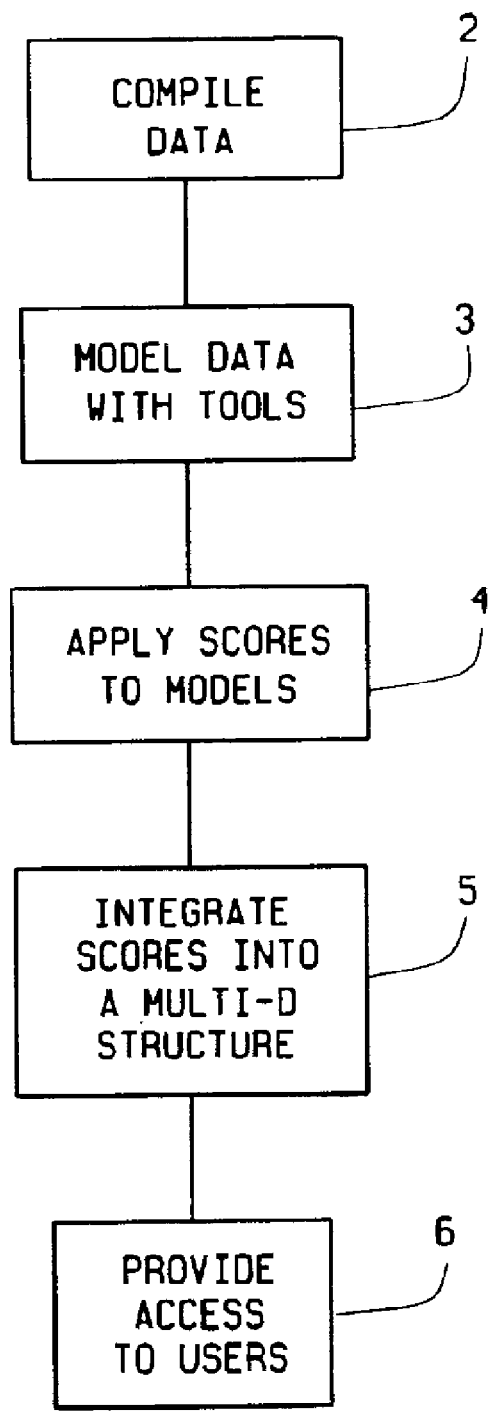
FIG. 1 is a flow chart illustrating process steps for generating a multi-dimensional structure of customer data.

FIG. 1 is a flow chart illustrating process steps for generating a multi-dimensional structure of customer data. Customer data as used herein refers to a summary, in electronic and/or printed form, of key indicia, such as, but not limited to income, age, account balances and purchasing activity.

Referring now specifically to FIG. 1, and in one exemplary embodiment of a system for generating a multi-dimensional structure, after a login into the system, the system prompts via a display that prompts the user for inputs, to enter data relating to customer activity for compilation 2, with other existing customer data stored in a relational database. Of course, the system is not limited to any one specific type of customer data. Once the user inputs data relating to customer activity, the system then applies models 3 to the newly entered data combined with the previously stored data and stored as a relational data base. Once the data has been modeled 3, using modeling tools, scores are applied 4 to the modeled data, in one embodiment, the scores are applied 4 according to user input criteria. Again, based on user input criteria, the scores are integrated 5 to build a multi-dimensioned structure of customer data, useful for future customer campaigns. Such structure are valuable to companies wishing to attract or retain a customer base, and an enterprise that can provide access 6 to such data to their customers holds a valuable commodity.

Figure 3:
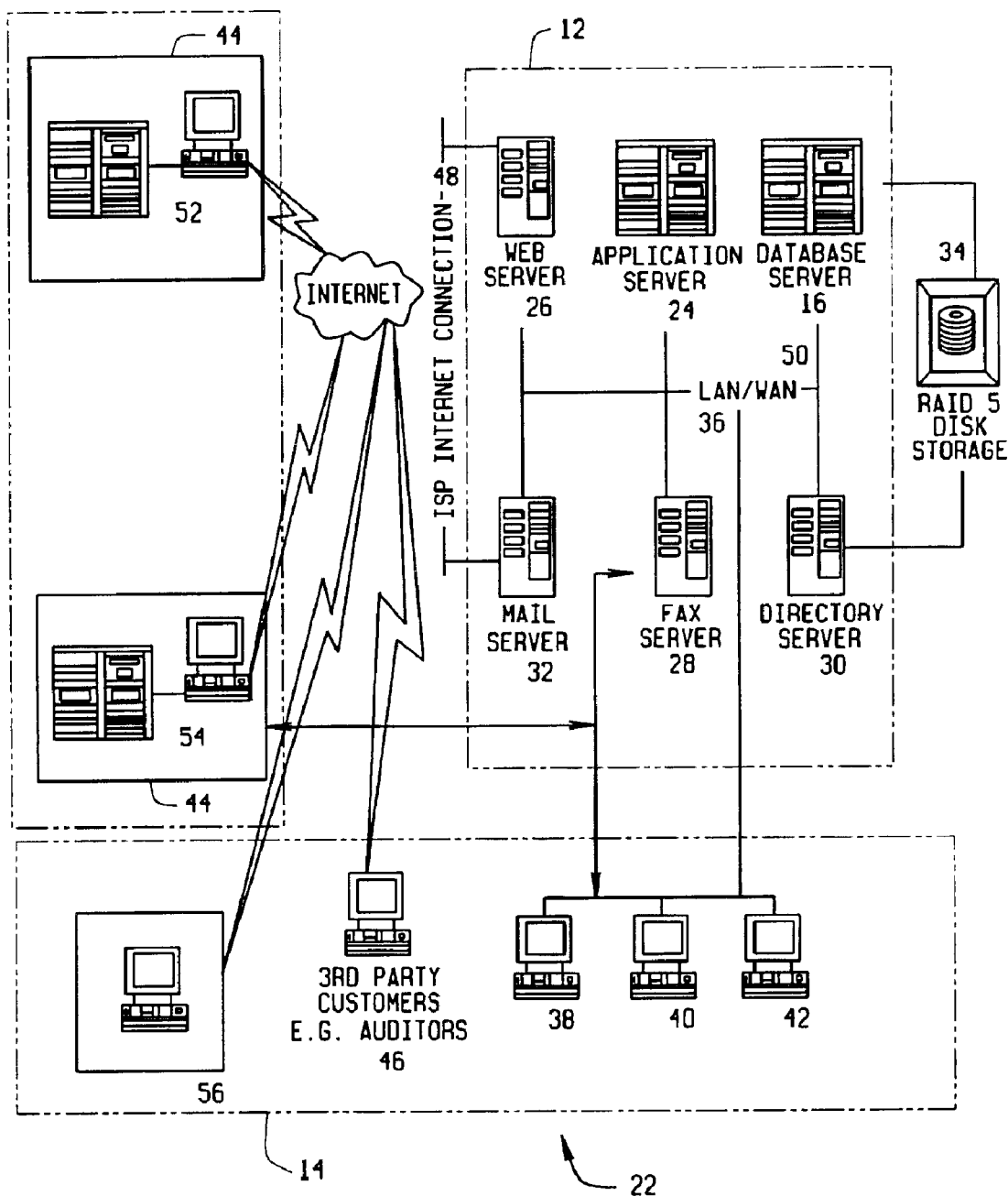
FIG. 3 is a block diagram of a network based system.
Figure 4:
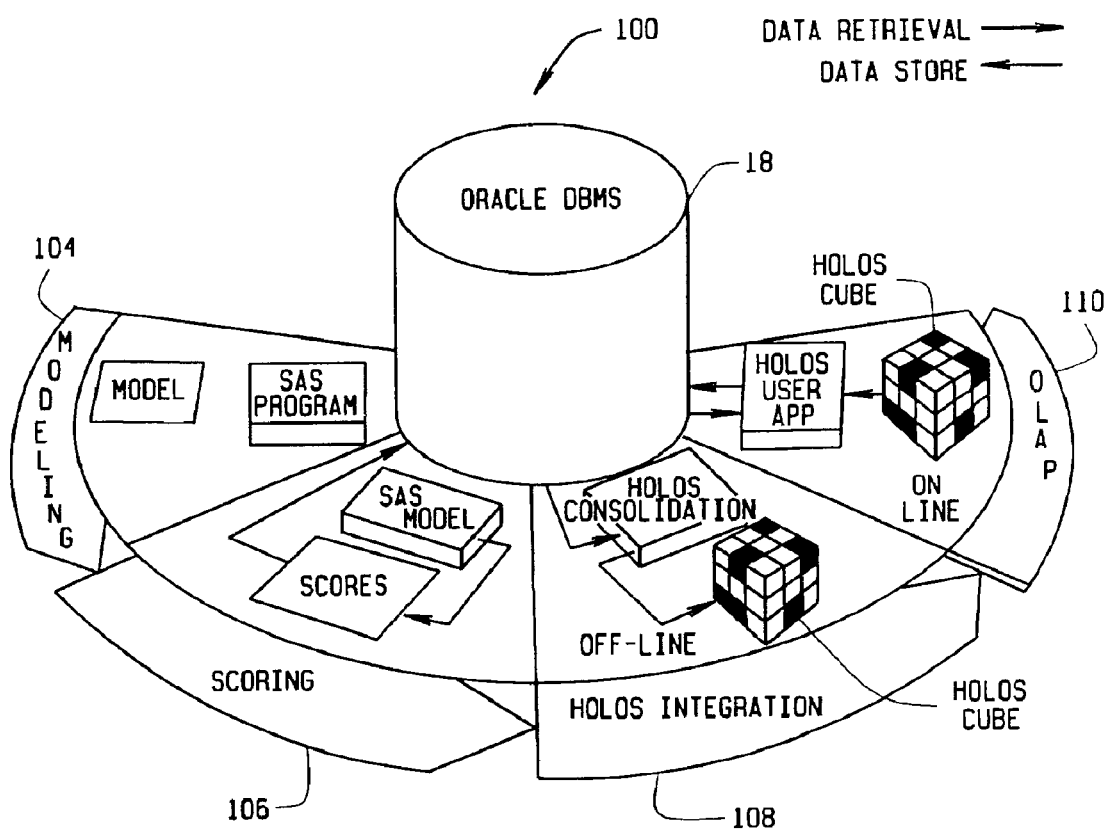
FIG. 4 is a data diagram of a relational database.

Set forth below are details regarding exemplary hardware architectures (FIGS. 2 and 3), and an exemplary data flow diagram illustrating processing for the building of such structures (FIG. 4). Although specific exemplary embodiments of methods and systems for generating multi-dimensional structures of customer data are described herein, the methods and systems are not limited to such specific exemplary embodiments.

Hardware Architecture

Figure 2:
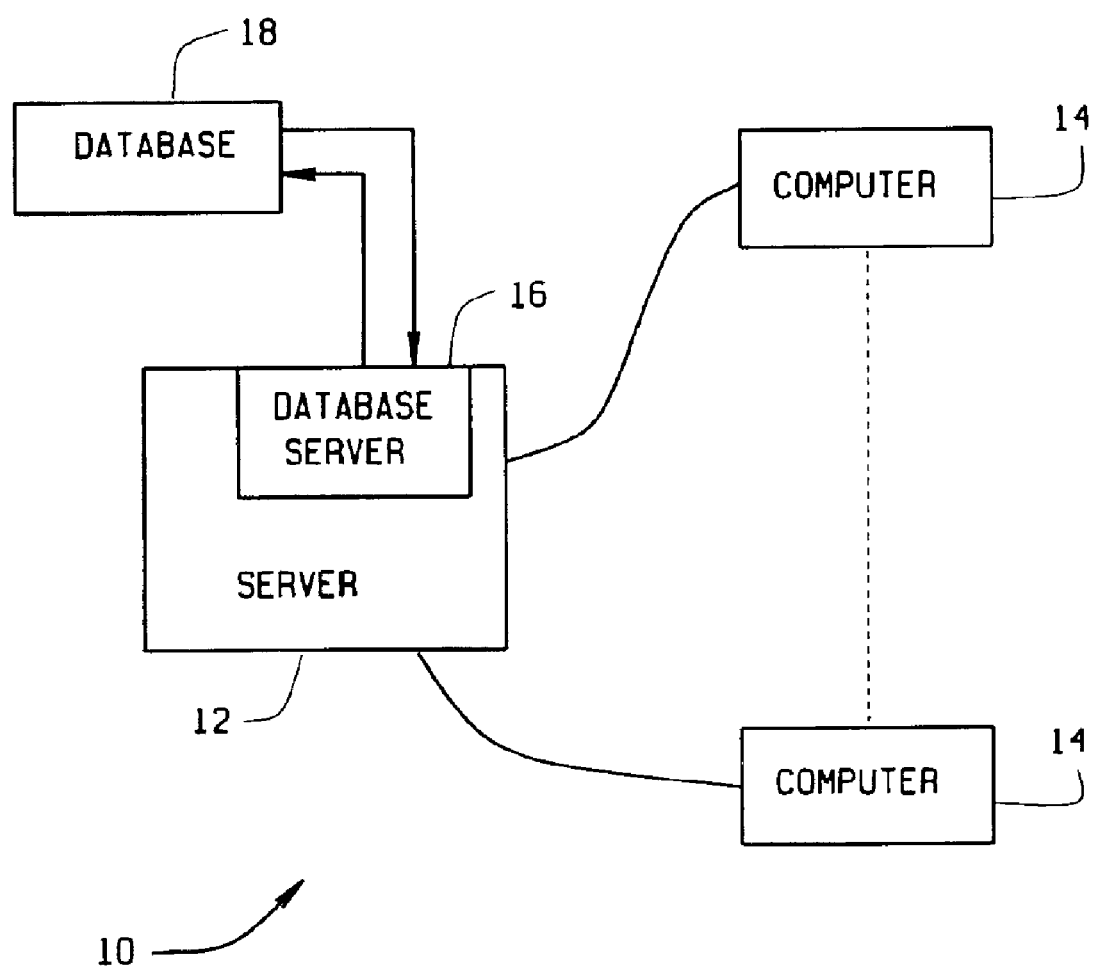
FIG. 2 is a block diagram of a system.

FIG. 2 is a block diagram of a system 10 that includes a server sub-system 12, sometimes referred to herein as server 12, and a plurality of customer devices 14 connected to server 12. In one embodiment, devices 14 are computers including a web browser, and server 12 is accessible to devices 14 via a network such as an intranet or a wide area network such as the Internet. In an alternative embodiment, devices 14 are servers for a network of customer devices.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 18. In one embodiment, centralized database 18 is stored on database server 16 and is accessed by potential customers at one of customer devices 14 by logging onto server sub-system 12 through one of customer devices 14. In an alternative embodiment centralized database 18 is stored remotely from server 12.

FIG. 3 is a block diagram of a network based system 22. System 22 includes server sub-system 12 and customer devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., customer, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any employee 44 or customer 46 having a work station 52 can access server sub-system 12. One of customer devices 14 includes a work station 54 located at a remote location. Work stations 52 and 54 are personal computers including a web browser. Also, work stations 52 and 54 are configured to communicate with server sub-system 12. Furthermore, fax server 28 communicates with employees 44 and customers 46 located outside the business entity and any of the remotely located customer systems, including a customer system 56 via a telephone link. Fax server 28 is configured to communicate with other work stations 38, 40, and 42 as well.

FIG. 4 is a data diagram 100 of a relational database 18 (also shown in FIG. 2) used for modeling and scoring collected data into modeled, scored and structured data available for use by an end user. Data is taken from different sources to create multi-dimensioned structures. Data can be collected from the WEB, from legacy systems and other sources and integrated into relational database 18. Also shown in the Figure is a process of transforming collected data into structured data for use by the end user. First, the data within database 18 is modeled 104, scored 106, structured 108 into multiple dimensions and made available 110 to customers for marketing projects, or for online analytical processing via system 22 (shown in FIG. 3).

Modeling 104 of the data within database 18 is accomplished in a number of ways including statistical software tools and non statistical tools. In the example embodiment, server 12 (shown in FIG. 2) is configured to apply the statistical software tools and the non-statistical tools against relational database 18 based on the customer data stored within database 18. The statistical software tools include a commercial statistical analysis software (SAS) system. In the example embodiment, non-statistical tools include at least Artificial Intelligence, Rule Based Methods, and user inputs. The statistical software tools and the non-statistical tools are applied against relational database 18 to develop models. A typical output of modeling 104 is an algorithm that will be used in scoring 106.

Results from modeling 104 are used in scoring 106 to score accounts and assign the accounts numerical values (i.e., scores) or economic worth (i.e., Net Present Value), as well as non numerical values. Non numerical scoring may include assignment of accounts to clusters, for example (Bargain Hunters, Young Achievers), deciles (top 10 percent) or classes (A,B,C,D).

Scoring results are integrated into a set of data elements or variables from the relational database to build cubes or multi-dimensional structures 108. All dimensions of the structures 108 are defined and calculated at this stage. Multi-dimensional structures 108 are built to support the business process (targeting, risk management, retention, etc . . . ). Processing at this stage is done offline using known software tool. These multi-dimensional structures 108 will provide the information needed for a decisioning phase, after transformation of data into information for decision making, where a customer determines how to use the data within multi-dimensional structures 108.

The decisioning phase is where end users interact with and use the knowledge built from previous phases (modeling, scoring and integration) through a GUI interface. Interaction is on-line. This is the phase where end users can implement optimal decisions (marketing, risk, operations, etc . . . ) with no knowledge of advanced modeling techniques used in modeling 104. End users can target consumers for cross-sell and develop strategies for better portfolio management. End users can generate reports, graphs, and track performance. Most information used by end users comes from multi-dimensional structures 108 built previously.

MODELS

Models are predicted customer profiles based upon historic data. Any number of models can be combined as an OLAP cube which takes on the form of a multi dimensional structure to allow immediate views of dimensions including for example, risk, attrition, and profitability.

Models are embedded, for example, within an engine running in application server 24 (shown in FIG. 3) as scores associated with each customer, the scores can be combined to arrive at relevant customer metrics. In one embodiment, models used are grouped under two general categories, namely marketing and risk. Examples of marketing models include: a net present value/profitability model, a prospect pool model, a net conversion model, an early termination (attrition) model, a response model, a revolver model, a balance transfer model, and a reactivation model. A propensity model is used to supply predicted answers to questions such as, how likely is this customer to: close out an account early, default, or avail themselves to another product (cross-sell). As another example, profitability models guide a user to optimized marketing campaign selections based on criteria selected from database 18. A payment behavior prediction model is included that estimates risk. Other examples of risk models are a delinquency and bad debt model, a fraud detection model, a bankruptcy model, and a hit and run model. In addition, for business development, a client prospecting model is used. Use of models to leverage consumer information ensures right value propositions are offered to the right consumer at the right time by tailoring messages to unique priorities of each customer.

The engine within application server 24 combines the embedded models described above to apply a score to each customer's account and create a marketing program to best use such marketing resources as mailing, telemarketing, and internet online by allocating resources based on consumer's real value. Engine 22 maintains a multi-dimensional customer database 18 based in part on customer demographics. Examples of such customer related demographics are: age, gender, income, profession, marital status, or how long at a specific address. The examples listed above are illustrative only and not intended to be exhaustive. Once a person has been a customer, other historical demographics can be added to database 18, by the sales force, for use in future targeting. For example, what loan products a customer has previously purchased is important when it comes to marketing that person a product in the future in determining a likelihood of a customer response. To illustrate, if a person has purchased an automobile loan within the last six months, it probably is unreasonable to expend marketing effort to him or her in an automobile financing campaign.

However a cash loan or home equity loan may still be of interest to the automobile loan purchaser. In deciding whether to market to him or her, other criteria that has been entered into database 18 is examined. Database 18 contains elements for tracking performance of previously purchased products, in this case the automobile loan. Information tracked contains, for example, how often payments have been made, how much was paid, in total and at each payment, any arrears, and the percentage of the loan paid. Again the list is illustrative only. Using information of this type, the engine within application server 24 can generate a profitability analysis by combining models to determine a probability score for response, attrition and risk. Customers are rank ordered by probability of cross-sell response, attrition, risk, and net present value. For example, if a consumer pays a loan off within a short time, that loan product was not very profitable. The same can be said of a product that is constantly in arrears. The effort expended in collection efforts tends to reduce profitability.

The engine within application server 24 uses the stored database 18 and generates a potential customer list based on scores based on demographics and the propensity to buy another loan product and expected profitability. Customers can be targeted by the particular sales office, dealers, product type, and demographic profile. The engine enables a user to manipulate and derive scores from the information stored within the consumer and structure databases. These scores are used to rank order candidate accounts for marketing campaigns based upon model scores embedded within the consumer and structure databases and are used in a campaign selection. Scores are generated with a weight accorded the factors, those factors being the demographics and the models used. Using the scores and profitability the engine generates a list of potential profitable accounts, per customer and/or per product, in a rank ordering from a maximum profit to a zero profit versus cost.

Figure 5:
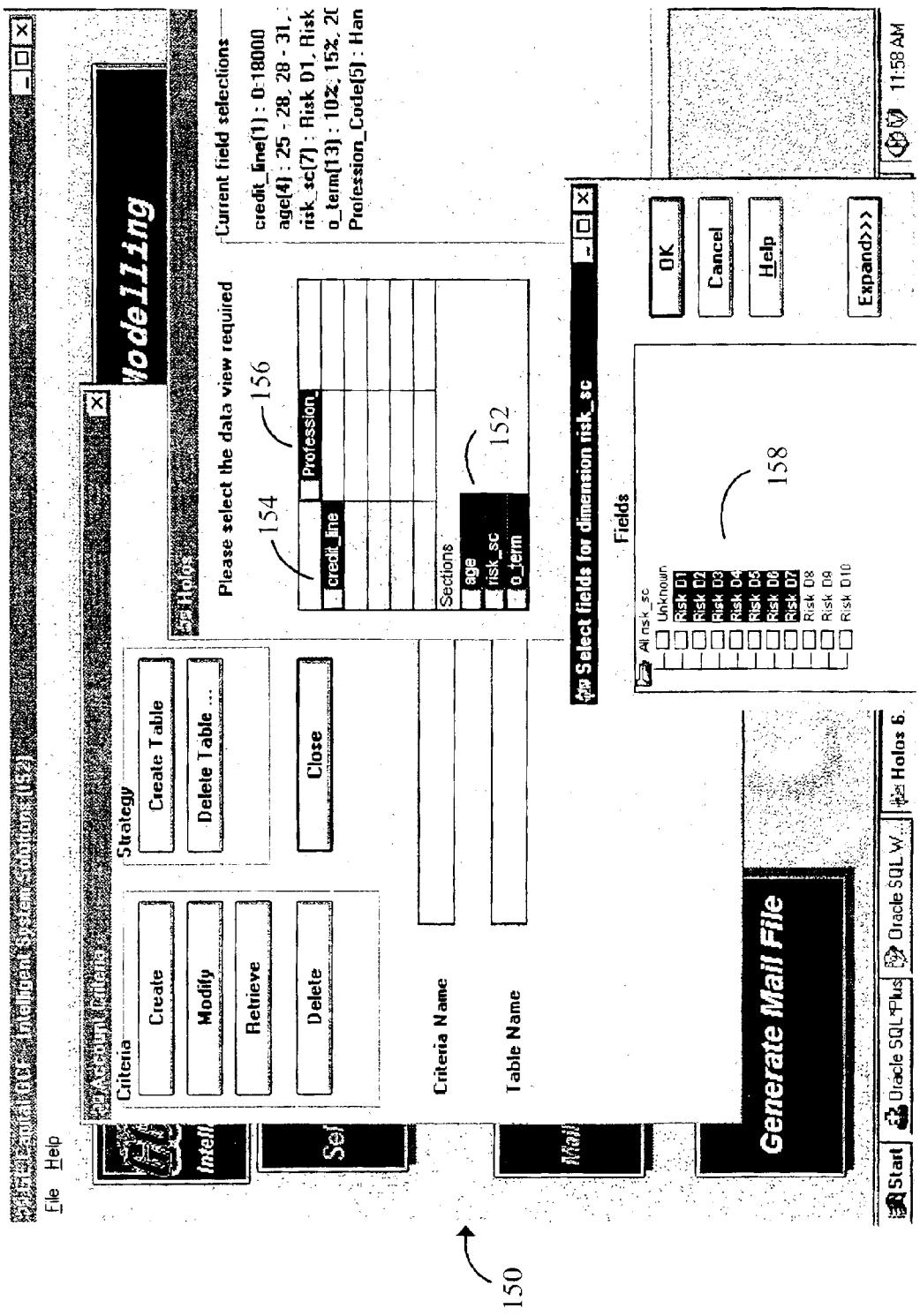
FIG. 5 is a graphical user interface for entering marketing criteria.

Users input the target consumer selection criteria into system 22 through a graphical user interface. An exemplary example of a graphical user interface 150 is shown in FIG. 5, which allows the user to input the marketing criteria. Example marketing criteria shown are age 152, credit line 154, a profession code 156, and a plurality of risk factors 158. Once a user has input criteria into database 18, that criteria is retained. Details of all available criteria are retained as entries in a database table and duplication of previous efforts is avoided.

Figure 6:
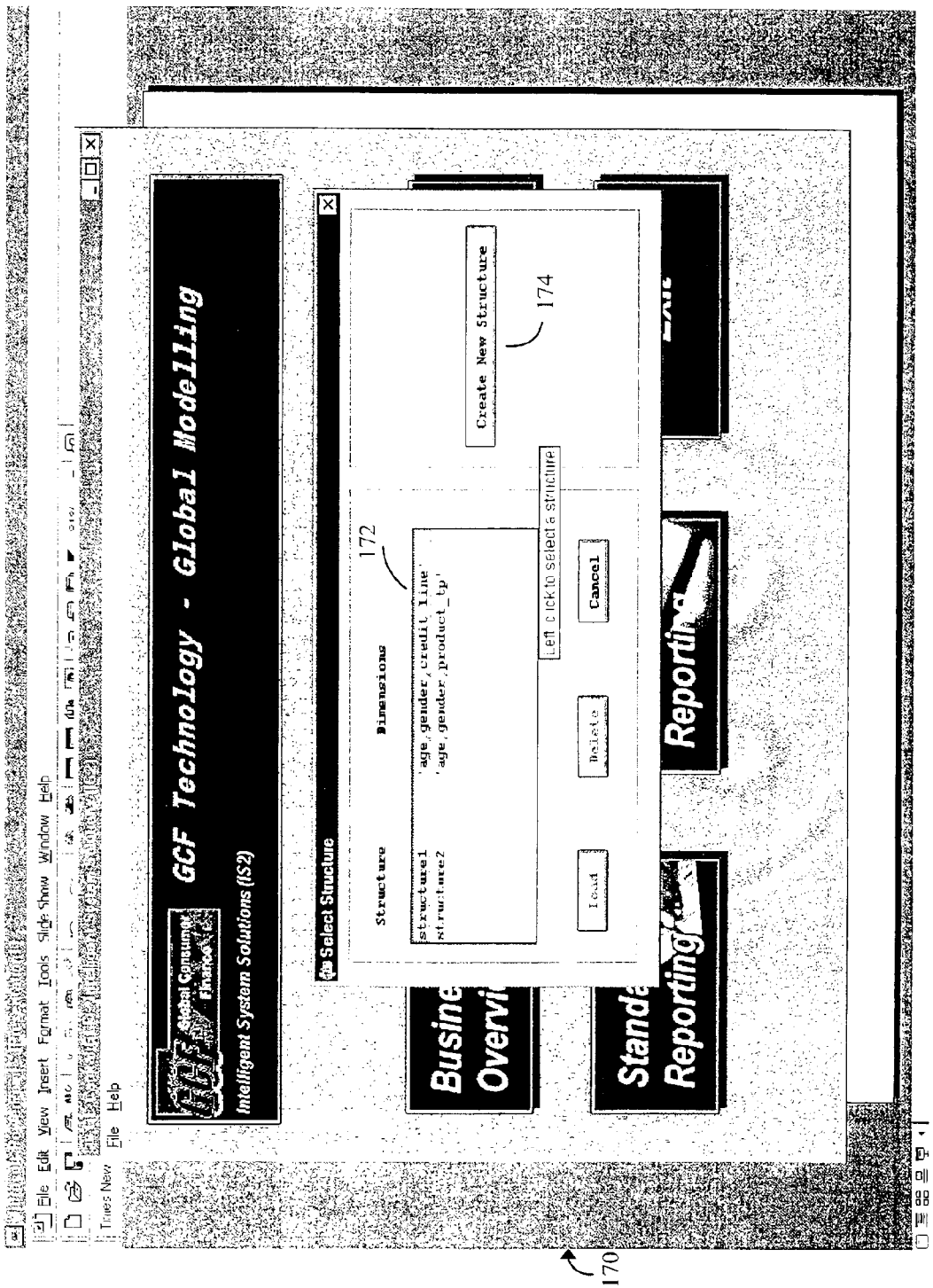
FIG. 6 is a graphical user interface showing structures built from a database.

FIG. 6 is a user interface 170 showing structures that have been built using data from database 18. Structure1 172 indicates that analysis is based on age, gender and credit line. Users can build new structures on an ad-hoc basis using data stored within database 18 by choosing the Create New Structure 174 on user interface 170.

A user can profile selected accounts and have scores assigned against user defined dimensions. Assigning a score allows results to be rank ordered as structures are built. While the invention has been described in terms of various specific embodiments, those skilled in the art will recognize that the invention can be practiced with modification within the spirit and scope of the claims.

What is claimed is:

1. A method for providing to an end user, multi-dimensional customer profiles, allowing the end user to effectively manage customer targeting, said method comprising the steps of:

compiling data from multiple sources to create a relational database;

using tools to model the relational database and produce a first modeling result including at least one marketing model and at least one risk model for a customer, wherein the at least one marketing model includes a net present value/profitability model, a prospect pool model, a net conversion model, an attrition model, a response model, a revolver model, a balance transfer model, and a reactivation model, the tools include non-statistical tools including artificial intelligence;

using the tools to compare the first modeling result to prior modeling results, and then select a modeling result to facilitate customer targeting;

scoring the modeled database using the selected modeling result;

integrating scores into a multi-dimensional structure; and providing access to end users to the multi-dimensional structure.

2. A method according to claim 1 wherein said step of compiling data from multiple sources further comprises the step of compiling data from at least one of world wide web, legacy customer data, and user input.

3. A method according to claim 1 wherein said step of using tools to model the relational database further comprises the step of using statistical analysis software to model the relational database.

4. A method according to claim 1 wherein said step of using tools to model the relational database further comprises the step of using non-statistical tools to model the relational database.

5. A method according to claim 4 wherein said step of using non-statistical tools to model the relational database further comprises the step of using at least one of rule based methods and user input to model the relational database.

6. A method according to claim 1 wherein said step of using tools to model the relational database further comprises the step of using the tools to generate an algorithm for use in scoring customer accounts stored within the relational database.

7. A method according to claim 1 wherein said step of scoring the modeled database further comprises the step of scoring each customer account stored within the relational database, and assigning each account at least one of a numerical value, a non numerical value, and an economic worth.

8. A method according to claim 7 wherein said step of scoring each customer account and assigning each account further comprises the step of assigning accounts having an assigned non-numerical value to at least one of classes, deciles and clusters.

9. A method according to claim 1 wherein said step of integrating scores into a multi-dimensional structure further comprises the step of defining and calculating dimensions of the structure.

10. A method according to claim 1 wherein said step of integrating scores into a multi-dimensional structure further comprises the step of transforming modeled data into information for decision making.

11. A method according to claim 1 wherein said step of providing access to end users further comprises the step of accessing information within the multi-dimensional structure through a graphical user interface.

12. A method according to claim 1 wherein said step of providing access to end users further comprises the step of generating at least one of reports, graphs and tracking results.

13. A method according to claim 1 wherein said step using tools to model the relational database further comprises the step of using tools to model the relational database to produce a plurality of marketing models and a plurality of risk models for a customer, wherein the marketing models include net present value/profitability model, a prospect pool model, a net conversion model, an attrition model, a response model, a revolver model, a balance transfer model, and a reactivation model, and wherein the risk models include a payment behavior prediction model, a delinquency model, a bad debt model, a fraud detection model, a bankruptcy model, and a hit and run model.

14. A method according to claim 1 wherein said step using tools to model the relational database further comprises the step of using tools to produce at least one marketing model and at least one risk model for a customer, wherein the at least one risk model includes a payment behavior prediction model, a delinquency model, a bad debt model, a fraud detection model, a bankruptcy model, and a hit and run model.

15. A system configured to provide to an end user, multi-dimensional customer profiles, allowing the end user to effectively manage customer targeting, said system comprising:

at least one computer;

a server configured to compile data from multiple sources to create a relational database, use tools including artificial intelligence to model data within the relational database and produce a first modeling result including at least one marketing model and at least one risk model, use tools to compare the first modeling result to prior modeling results and then select a modeling result to facilitate customer targeting, score the modeled data using the selected modeling results, integrate the scores into a multi-dimensional structure and provide access to the multi-dimensional structure, wherein the at least one risk model includes a payment behavior prediction model, a delinquency model, a bad debt model, a fraud detection model, a bankruptcy model, and a hit and run model; and a network connecting said computer to said server.

16. A system according to claim 15 wherein said server configured to compile data from at least one of world wide web, legacy customer data, and user input.

17. A system according to claim 15 wherein said server configured to use statistical analysis software to model data within the relational database.

18. A system according to claim 15 wherein said server configured to use non-statistical tools to model data within the relational database.

19. A system according to claim 18 wherein said server configured to use at least one of rule based methods and user input to model data within the relational database.

20. A system according to claim 15 wherein said server configured to generate an algorithm for use in scoring customer accounts stored within the relational database.

21. A system according to claim 15 wherein said server configured to score each customer account stored within the relational database, and assign each account at least one of a numerical value, a non numerical value, and an economic worth.

22. A system according to claim 21 wherein said server configured to assign accounts having an assigned non-numerical value to at least one of classes, deciles and clusters.

23. A system according to claim 15 wherein said server configured to define and calculate dimensions of the structure.

24. A system according to claim 15 wherein said server configured to transform modeled data into information for decision making.

25. A system according to claim 15 wherein said server configured to allow access to information within the multi-dimensional structure through a graphical user interface.

26. A system according to claim 15 wherein said server configured to generate at least one of reports, graphs and tracking results.

27. A system according to claim 15 wherein said at least one marketing model includes a net present value/profitability model, a prospect pool model, a net conversion model, an attrition model, a response model, a revolver model, a balance transfer model, and a reactivation model.

28. A system according to claim 15 wherein said server is further configured to use tools to model data within the relational database to produce a plurality of marketing models and a plurality of risk models for a customer, wherein the marketing models include a net present value/profitability model, a prospect pool model, a net conversion model, an attrition model, a response model, a revolver model, a balance transfer model, and a reactivation model, and wherein the risk models include a payment behavior prediction model, a delinquency model, a bad debt model, a fraud detection model, a bankruptcy model, and a hit and run model.

* * * * *